US011924944B1

(12) United States Patent
Wu

(10) Patent No.: US 11,924,944 B1
(45) Date of Patent: Mar. 5, 2024

(54) SYSTEM AND METHOD FOR VOICE-ACTIVATED LIGHTING CONTROL

(71) Applicant: Fourstar Group Inc., Taipei (TW)

(72) Inventor: Yu-Chi Wu, Taipei (TW)

(73) Assignee: Fourstar Group Inc., Taipei (TW)

( * ) Notice: Subject to any disclaimer, the term of this patent is extended or adjusted under 35 U.S.C. 154(b) by 186 days.

(21) Appl. No.: 17/498,955

(22) Filed: Oct. 12, 2021

(51) Int. Cl.
*H05B 47/12* (2020.01)
*G10L 15/22* (2006.01)
*H04R 1/40* (2006.01)
*H04R 3/00* (2006.01)

(52) U.S. Cl.
CPC .............. *H05B 47/12* (2020.01); *G10L 15/22* (2013.01); *H04R 1/406* (2013.01); *H04R 3/005* (2013.01); *G10L 2015/223* (2013.01)

(58) Field of Classification Search
CPC ... H05B 47/12; G10L 15/22; G10L 2015/223; H04R 1/406; H04R 3/005
See application file for complete search history.

(56) References Cited

U.S. PATENT DOCUMENTS

| 9,320,101 | B2 | 4/2016 | Sun et al. | |
|---|---|---|---|---|
| 9,411,882 | B2 * | 8/2016 | Cory | G10L 19/008 |
| 9,414,466 | B2 | 8/2016 | Dvash | |
| 9,805,575 | B2 | 10/2017 | Sun et al. | |
| 10,492,277 | B2 | 11/2019 | Zhang | |
| 10,945,327 | B2 | 3/2021 | Zhang | |
| 11,443,739 | B1 * | 9/2022 | Deller | G10L 15/26 |
| 2015/0025664 | A1 * | 1/2015 | Cory | G10L 19/008 |
| | | | | 700/94 |
| 2015/0110355 | A1 * | 4/2015 | Dill | H05B 47/115 |
| | | | | 382/103 |
| 2017/0105081 | A1 * | 4/2017 | Jin | G10H 1/368 |
| 2018/0020530 | A1 * | 1/2018 | Scordato | F21V 29/70 |
| 2018/0177029 | A1 * | 6/2018 | Wang | G06F 3/167 |
| 2020/0005076 | A1 * | 1/2020 | Dill | G06V 40/23 |
| 2021/0176842 | A1 | 6/2021 | Zhang | |

FOREIGN PATENT DOCUMENTS

| CN | 113873735 A | * 12/2021 | |
|---|---|---|---|
| JP | 2017055797 A | * 3/2017 | |
| WO | WO-2015121011 A1 | * 8/2015 | H05B 33/0815 |

OTHER PUBLICATIONS

VOCCA Users Manual, https://www.vocca.shop/manual.

* cited by examiner

*Primary Examiner* — Abdullah A Riyami
*Assistant Examiner* — Syed M Kaiser
(74) *Attorney, Agent, or Firm* — Salter & Michaelson

(57) ABSTRACT

A voice-activated light system that includes a microphone for receiving one or more voice commands (which may be referred to as a "voice microphone"), one or more light sources (such as LEDs) coupled to a controller and a light driver. The light driver is for driving the light sources and the controller is for detecting a voice command in order to control the mode of operation of the one or more light sources. The controller can have multiple control commands each for selecting a different mode of operation of the light source(s). The modes can be controlled by a common voice input term followed by a second voice command corresponding to a mode of operation of the light source. The system may include a second microphone which may be referred to herein as a "music microphone". The commands can include "light show," "slow pulse," "steady on," "blinking," or "off".

1 Claim, 6 Drawing Sheets

SYSTEM AND METHOD FOR VOICE-ACTIVATED LIGHTING CONTROL

FIELD OF THE INVENTION

The present invention relates in general to a system and method for detecting one or more voice command(s) and controlling one or more lights or LEDs according to the detected voice command(s).

SUMMARY OF THE INVENTION

The present invention enables voice-activated control of a string having one or more LEDs. In one configuration, the system for lighting control includes a microphone for receiving one or more voice commands, a controller coupled to the microphone for receiving the one or more voice commands from the microphone, one or more light sources controlled by the controller, and a light driver for driving the one or more light sources. The controller can have multiple control commands each for selecting a different light control mode of operation, and each light control mode of operation can be controlled by a common voice input term followed by at least one of the one or more voice commands.

In the system, the multiple control commands have one of the following different light control modes of operation: I) a light show mode where the light sources are controlled in a light pattern according to beat of a music signal; ii) a steady on mode where the light sources are controlled to be continuously on; iii) a slow pulse mode where the light sources are controlled to be pulsed; iv) a blinking mode where the light sources are blinking rapidly; or v) an off mode where the light source are turned off. In the system, the common voice input term can be "Hi Beatsync". In the system, the term "Hi Beatsync" can be repeated before initiating any of the multiple control commands. In the system, each command can be pre-stored into memory coupled to the controller. The system can further include a second microphone configured to receive music signals. In the system, the controller can be configured to control the light sources according to the voice command. In the system, the one or more light sources can be on a single channel coupled to the controller. The system can include two channels coupled to the controller, each channel having one or more light sources. The system can include two channels coupled to the controller, each channel having multiple light sources.

A system for lighting control includes a first microphone for receiving one or more voice commands, a controller coupled to the first microphone for receiving the one or more voice commands from the first microphone, a second microphone for receiving a music signal; one or more light sources controlled by the controller, and a light driver for driving the one or more light sources, wherein the controller has multiple control commands each for selecting a different light control mode of operation, wherein at least one light control mode of operation is dependent on the music signal, and wherein each light control mode of operation is controlled by a common voice input term followed by at least one of the one or more voice commands. In the system, the multiple control commands have one of the following different light control modes of operation: I) a light show mode where the light sources are controlled in a light pattern according to beat of a music signal; ii) a steady on mode where the light sources are controlled to be continuously on; iii) a slow pulse mode where the light sources are controlled to be pulsed; iv) a blinking mode where the light sources are blinking rapidly; or v) an off mode where the light source are turned off. The system further includes a first channel having a first plurality of light sources and a second channel having a second plurality of light sources. In the system, the one or more light sources are on a single channel coupled to the controller.

A method for controlling one or more light sources includes receiving a voice command at a microphone, determining a light control mode of operation corresponding to the voice command received at the microphone, and controlling the one or more light sources by a controller according to the mode of operation that corresponds to the voice command. In the method, determining the light control mode of operation comprises comparing the voice command received at the microphone to a plurality of pre-stored commands in memory coupled to the controller. In the method, at least one of the light control modes of operation is dependent on a music signal. In the method, the music signal is received at a second microphone. In the method, the one or more light sources are configured as a single channel and the brightness of the single channel is controlled according to the music signal. In the method, the one or more light sources are configured as at least two channels that are each controlled separately according to the music signal received at the second microphone.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

In accordance with the present invention as illustrated in FIGS. 1-6, there is provided a voice-activated light system that includes a microphone for receiving one or more voice commands (which may be referred to as a "voice microphone" in that it receives the voice commands), one or more light sources (such as LEDs) coupled to a controller and a light driver. The light driver is for driving the one or more light sources and the controller is for detecting a voice command in order to control the mode of operation of the one or more light sources. The controller can have multiple control commands each for selecting a different mode of operation of the light source(s). The modes can be controlled by a common voice input term followed by a second voice command corresponding to a mode of operation of the light source. The system may include a second microphone (or the functionalities may be combined into a single microphone that listens for both the voice commands and the music signals, either concurrently or sequentially) which may be referred to herein as a "music microphone" in that it receives the music signal when implemented as a separate microphone. The modes can include a "light show" mode where the light sources operate according to the beat or music, a "steady on' mode where the light sources are continuously on; a "slow pulse" mode where the light sources are pulsed slowly; a "blinking" mode where the light sources blink rapidly; and an "off" mode where the light sources are turned off. In operation, for example, a user may state "Hi Beatsync" as the initial common voice input term, followed by one of the following terms "light show," "slow pulse," "steady on," "blinking," or "off" to initiate one of the modes. The light sources are then controlled by the light driver according to the mode that corresponds to the voice command. It will be appreciated that another common input term may be used such as "Hi," "Hello," or any other appropriate input term, and that other voice commands may be implemented, as well as other modes of operation. In some instances, the voice command feature may be combined with modes of operation that are not music based, in which case a single microphone would be used and there would not be a mode that is dependent upon the music signal. Although not shown, the system may include one or more amplifiers to amplify one or more signals received by the system, including the voice command(s) and the music signal.

Figure 1:
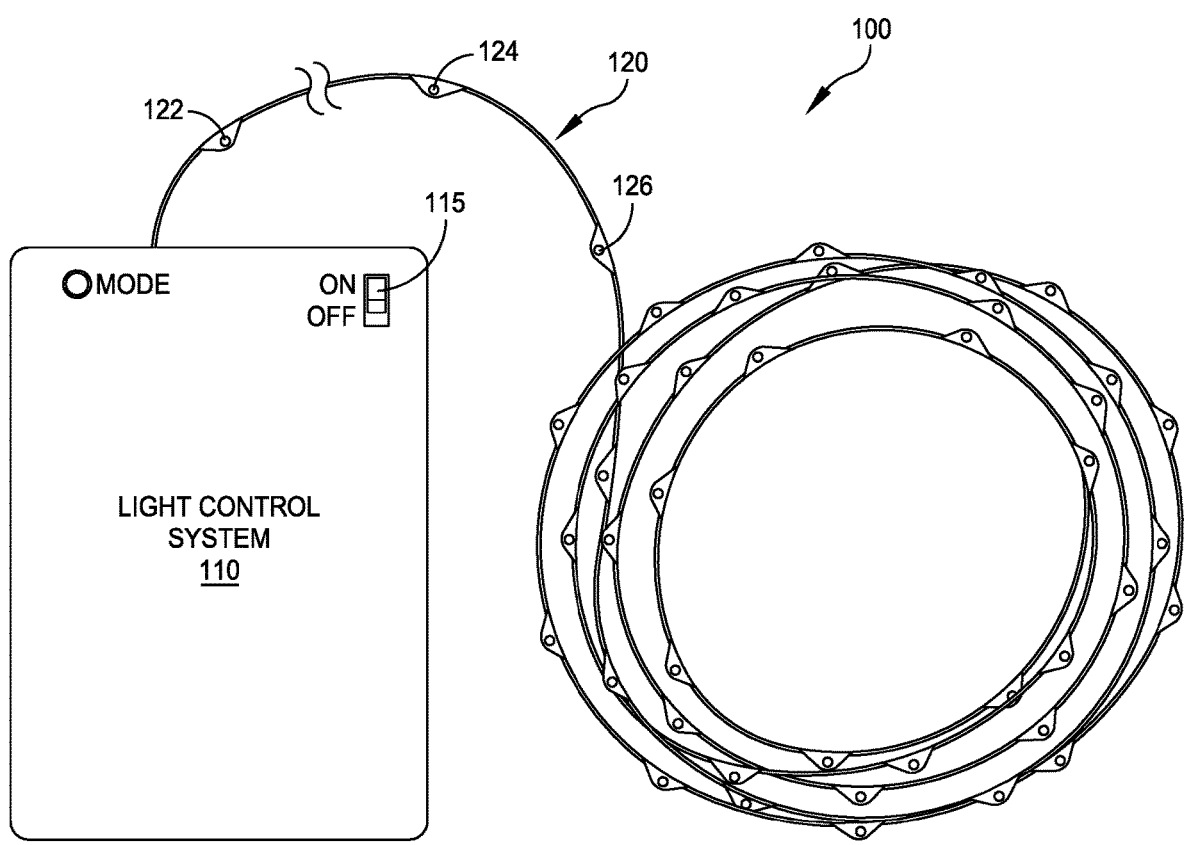
FIG. 1 is a perspective view of a light control system and associated LED string having a single channel with a plurality of embedded LEDs bound by a wire, such as copper, according to the present disclosure.

FIG. 1 is a perspective view of a voice-activated light system 100 including a light control system 110 and associated LED string 120 having a single channel with a plurality of embedded LEDs bound by a wire, such as copper, according to the present disclosure. The string 120 includes embedded LEDs 122, 124, and 126. The light control system 110 can include a switch 115 that turns one or more components of the light control system on. The internal components of the light control system 110 are shown in one example implementation in FIG. 4. Some embodiments may be purely voice-activated as opposed to having a switch, for example as shown in FIG. 2.

Figure 2:
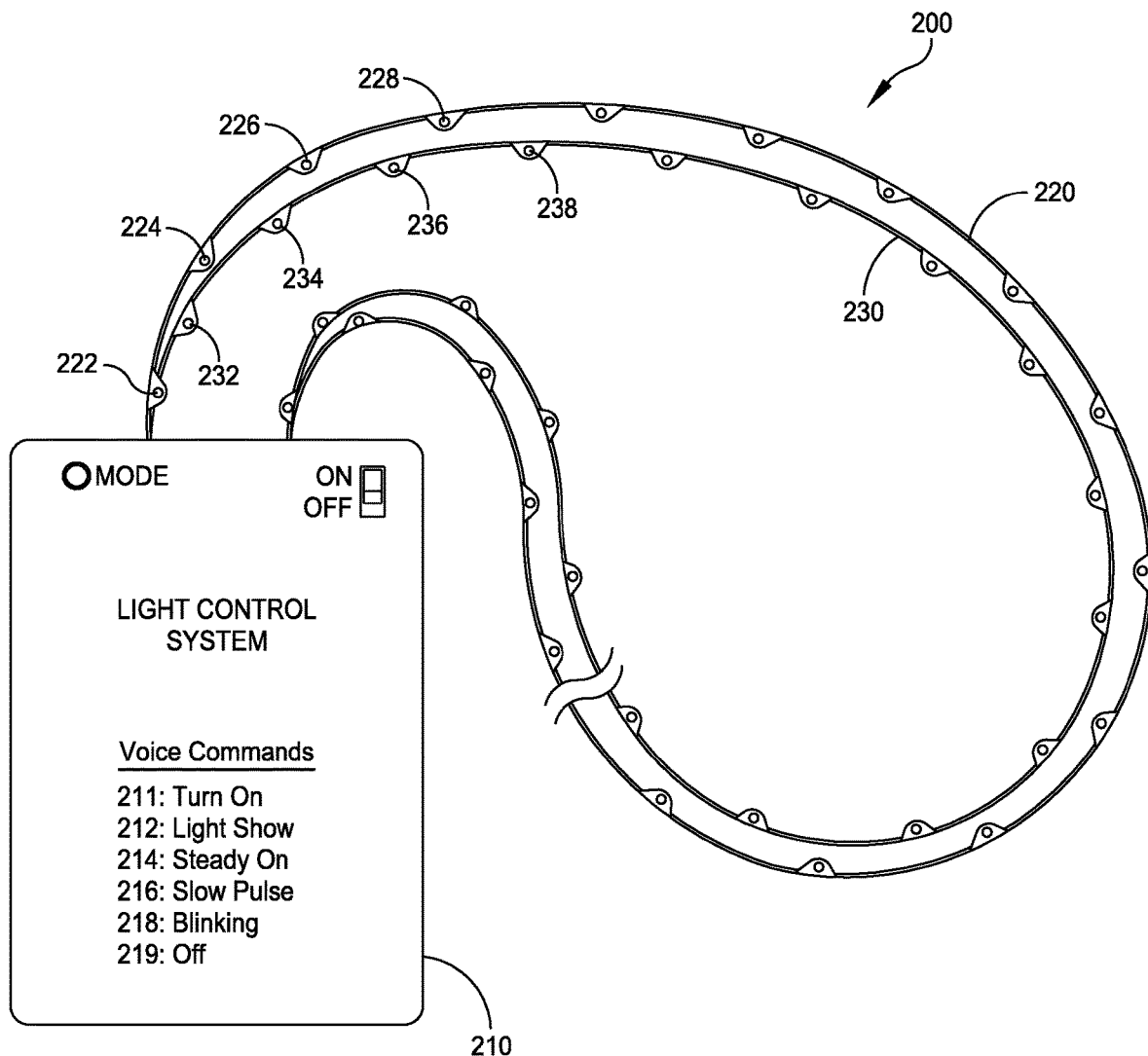
FIG. 2 is a perspective view of a light control system and associated LED string having two channels with a plurality of embedded LEDs in each channel bound by a wire, according to the present disclosure.

FIG. 2 is a perspective view of a light control system and associated LED string having two channels with a plurality of embedded LEDs in each channel bound by a wire, according to the present disclosure. The voice-activated light system 200 includes a light control system 210 and associated light strings 220, 230 each having a separate channel with a plurality of light sources. The internal components of the light control system 210 are shown in one example implementation in FIG. 4. The string 220 includes a first plurality of light sources, including at least light sources 222, 224, 226, 228, and the string 230 includes a second plurality of light sources, including at least light sources 232, 234, 236, 238. The light control system 210 can include a switch (for example switch 115 as shown in FIG. 1) or can alternatively be completely voice-activated such that an initial term or a common voice input term such as "Hi Beatsync". Thereafter, a second voice command indicative of a light control mode of operation can be selected, and these can be listed on a front surface of the light control system 210, including a "turn on" command 211, "light show" command 212, "steady on" command 214, "slow pulse" command 216, "blinking" command 218, and "off" command 219. In the "light show" mode the light sources operate according to the beat or music, in the "steady on' mode the light sources are continuously on; in the "slow pulse" mode the light sources are pulsed slowly; in the "blinking" mode the light sources blink rapidly; and in the "off" mode the light sources are turned off. In some systems, instead of a switch, or in addition to a switch, there can be provided a mode button (e.g., mode switch 432 in FIG. 4) that allows a user to manually transition between the modes either in lieu of, or in addition to, the voice commands. For example, if the microphone becomes disabled, a user can still manually select the mode of operation for the light string(s).

It will be appreciated that any number of light sources and any number of strings (and thus individual channels) can be implemented, from a single string with a first plurality of light sources through to any number of strings each having a number of light sources). It will be appreciated that the light sources can be embedded and then encased, for example, in a plastic coating as shown in FIGS. 1 and 2. Or the light sources can each extend or otherwise protrude from a coated wire, as shown in FIG. 3.

Figure 3:
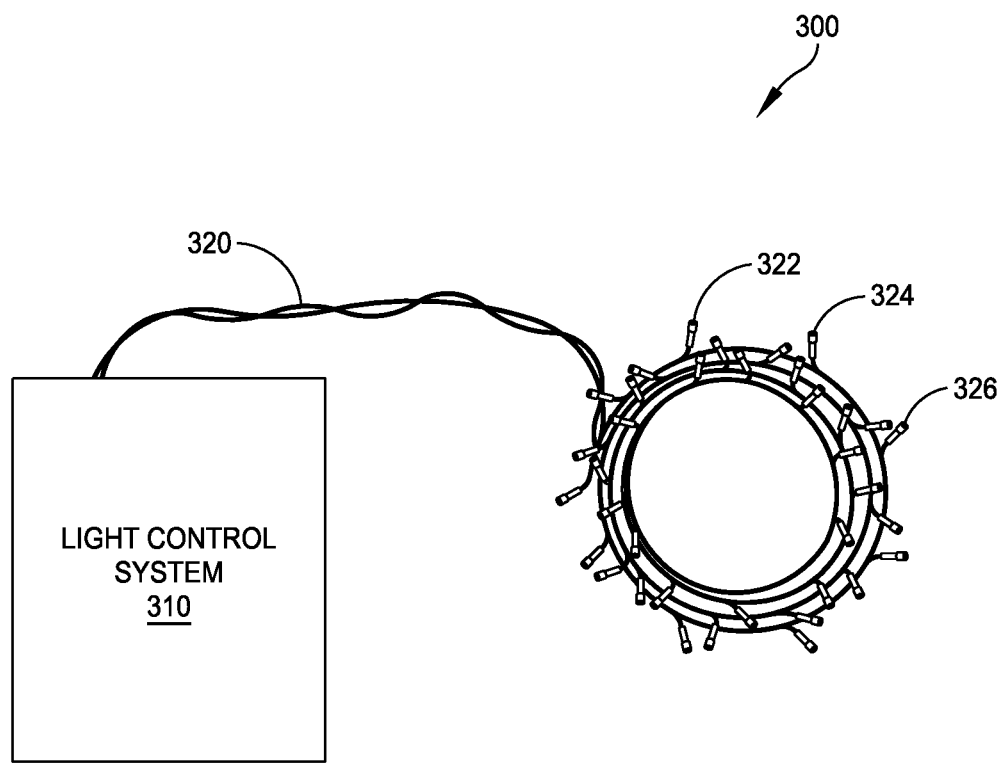
FIG. 3 is a perspective view of a light control system and associated LED string having one channel with a plurality of protruding LEDs bound by a coated wire, according to the present disclosure.

FIG. 3 is a perspective view of a light control system and associated LED string having one channel with a plurality of LEDs protruding from a coated wire, according to the present disclosure. The voice-activated light control system 300 includes the light control system 310 and a string 320 of a plurality of LEDs including at least LEDs 322, 324, 326. In this example, the string 320 is a single channel implementation having the plurality of LEDs that each protrude from a coated wire, as shown. The light control system 310 can include a switch to turn the device on or can be purely voice activated, as will be appreciated. The internal components of the light control system 310 are shown in one example implementation in FIG. 4.

Figure 4:
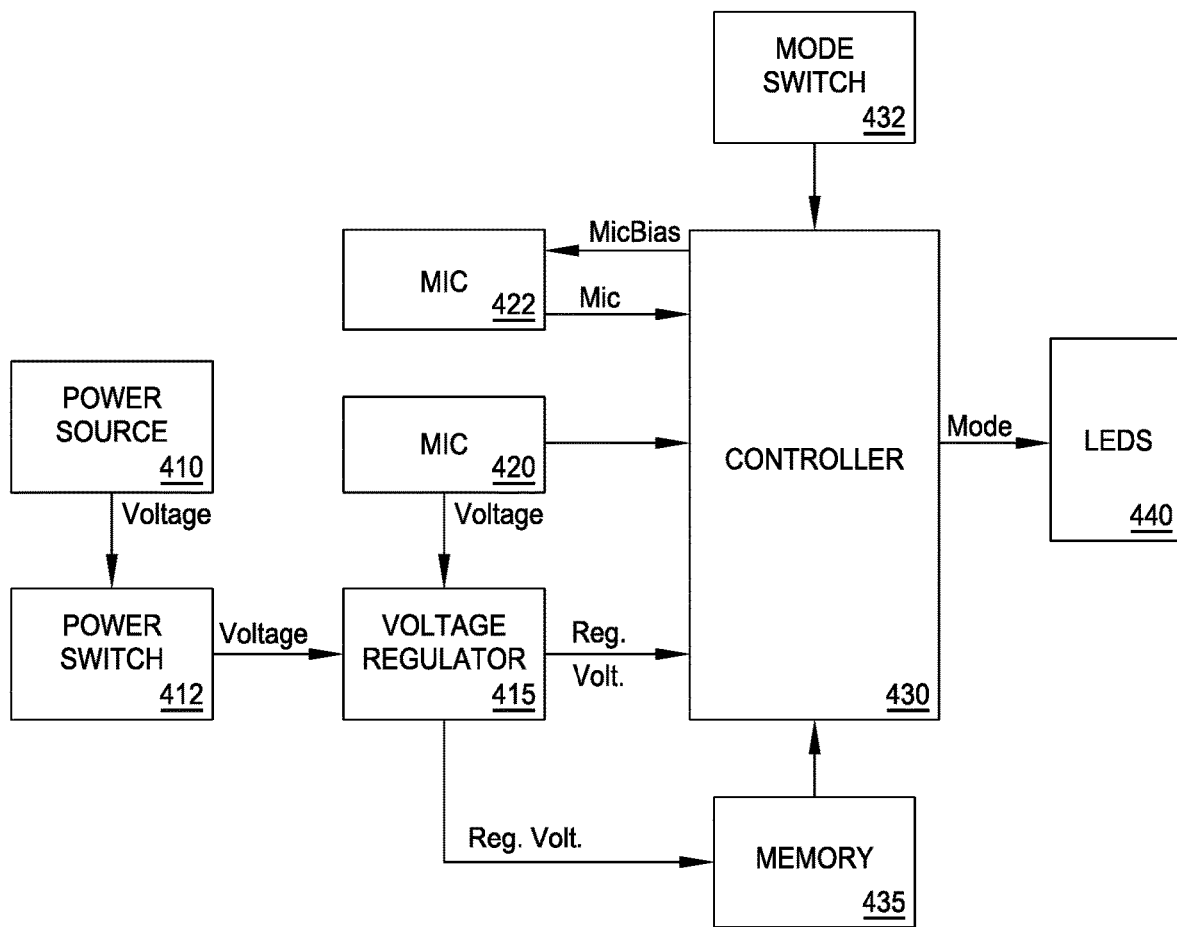
FIG. 4 is a block diagram illustrating the components of the light control system, including at least one microphone, a controller, and at least one light source, according to the present disclosure.

FIG. 4 is a block diagram illustrating the components of the light control system, including at least one microphone, a controller, and at least one light source, according to the present disclosure. The block diagram of FIG. 4 provides one example implementation of the light control system (e.g., 110 in FIG. 1, 210 in FIG. 2, or 310 in FIG. 3) that is coupled to, and controls, the one or more light sources. The light control system includes a power source 410, which may be a DC power source such as a 5 Volt (V) battery, or may be an AC power source from an AC power outlet, or may be any appropriate power source such as solar power, as will be appreciated to one having ordinary skill in the art. The power source 410 provides a voltage (such as 5V) that is provided to a voltage regulator 415 to provide a regulated amount of voltage to the microphone 420, microphone 422, controller 430, and memory 435. The power source 410 may be coupled to a power switch 412 (e.g., switch 115 in FIG. 1) to control power supplied to the components of the light control system. A mode switch 432 may also be provided to allow for manual selection of the light control mode of operation. Although the microphone 422 is shown as being indirectly connected to the voltage regulated power (via the controller 430) the microphone 422 may be directly coupled to the voltage regulator 415 in some implementations. The controller 430 is configured to process the voice commands, compare the voice commands to one of a plurality of pre-stored commands in memory, and send the mode of light control to the light sources to thereby control the light sources. The controller 430 can include a light driver for driving the light sources. The regulated voltage provided to the controller 430 may be provided as a first voltage level, such as 3.3V, and also as a second voltage level, such as 1.1V. The first voltage level 3.3V can be provided to the microphone 422, and the second voltage level 1.1V can be provided to the LEDs to provide the power thereto. The regulated voltage provided to the memory 435 can be 3.3V and the regulated voltage provided to the microphone 420 can be 3.3V. The memory 435 can be FLASH memory or any other memory that does not lose its value when there is no power applied to the system. The microphone 420 can be considered the music microphone that listens to and interprets the music signal to determine how the light sources will be controlled. Refer, for example, to commonly owned U.S. Pat. No. 10,492,277 for a detailed discussion of controlling a light source using a musical beat detection system, the entire disclosure of which is expressly incorporated by reference herein. The microphone 422 can be considered the voice microphone that detects one or more voice commands, in accordance with the techniques of the present disclosure.

The controller 430 is configured to receive the voice command from the microphone 422, compare the voice command to a plurality of pre-stored commands within memory 435, and determine the mode of operation that corresponds to the voice commands. The controller 430 then controls the light sources 440 according to the mode that corresponds to the received voice command. The LED(s) 440 can be the same as the light string 120 shown in FIG. 1, the light strings 220, 230 shown in FIG. 2, and the light string 320 shown in FIG. 3.

It will be appreciated that although two separate microphones are shown, there may be a single microphone capable of both the voice and music functionality. Also, in some implementations, only a voice microphone may be used and the music microphone may be omitted so that voice commands are used to control the mode of operation of the light system.

Figure 5:
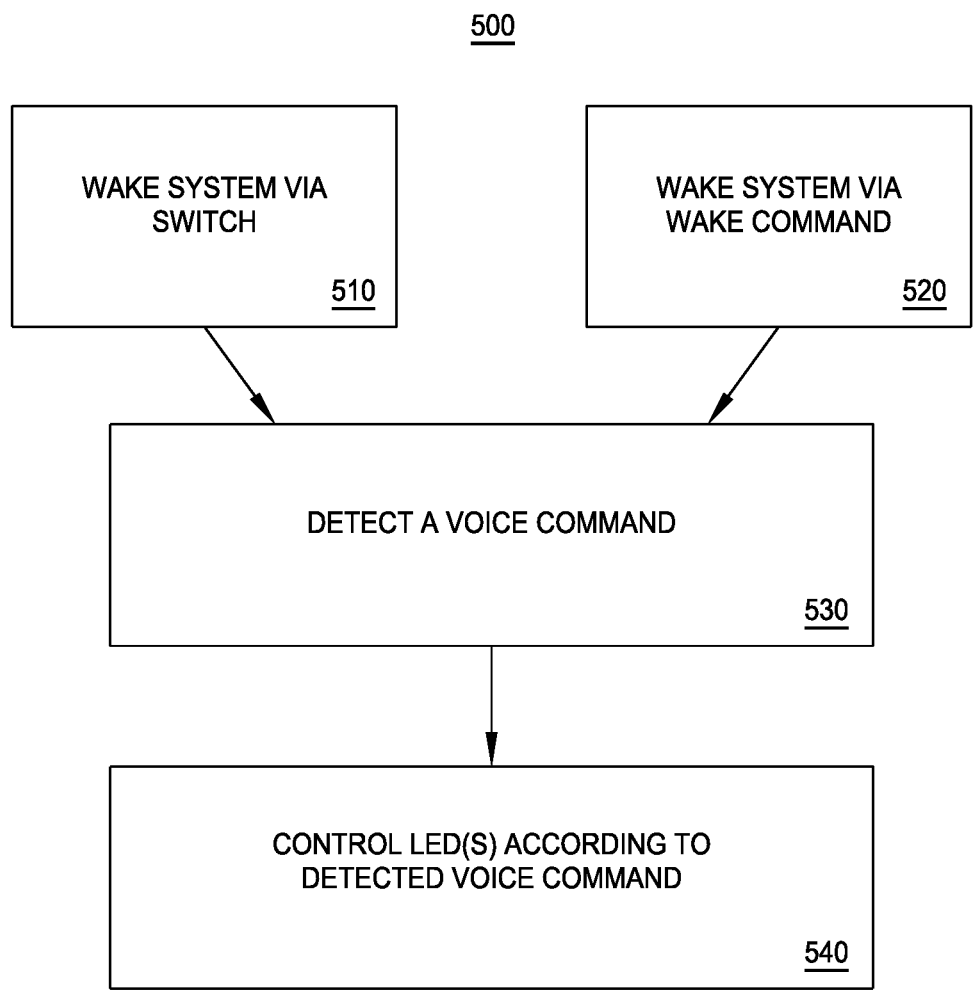
FIG. 5 is a flow chart illustrating an overall method for voice-activated light control, according to the present disclosure.

FIG. 5 is a flow chart illustrating an overall method 500 for voice-activated light control, according to the present disclosure. The method 500 commences at either 510 by waking the system via a switch (e.g., switch 115 in FIG. 1) or at 520 by waking the system via a wake command or common voice input term. After waking the system, the voice microphone is turned on and a voice command is detected at 530. The LED(s) are then controlled at 540 according to the detected voice command. For example, the "light show" voice command corresponds to the light control mode that controls the light sources to operate according to the beat or music; the "steady on" voice command corresponds to the light control mode that controls the light sources to operate continuously on; the "slow pulse" voice command corresponds to the light control mode that controls the light sources to be pulsed slowly; the "blinking" voice command corresponds to the light control mode that controls the light sources to blink rapidly; and the "off" voice command corresponds to the light control mode that controls the light sources to be turned off.

In the case of a single channel having one or more light sources (e.g. LEDs) the "light show" command can initiate the "light show" mode of light control operation where the brightness of the light sources are controlled according to the beat, such that when the beats are detected the brightness is turned up, and when not detected the brightness is turned down. In the case of two (or more) channels, each channel can be controlled separately according to the beat of the musical signal detected, such that the light show and thereby light displayed corresponds to the beat of the musical signal.

Figure 6:
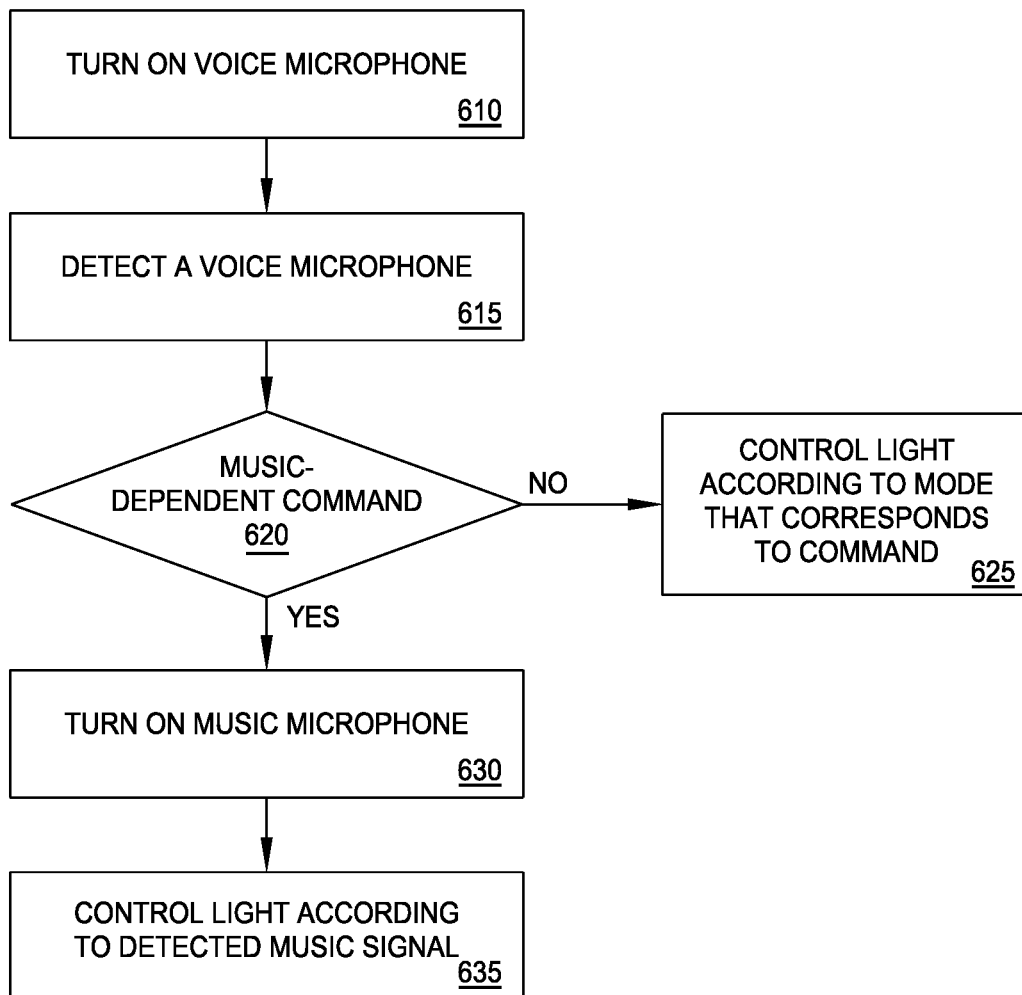
FIG. 6 is a flow chart illustrating an example method for voice-activated light control that includes beat-activated lighting modes, according to the present disclosure.

FIG. 6 is a flow chart illustrating an example method 600 for voice-activated light control that includes beat-activated lighting modes, according to the present disclosure. At 610, the voice microphone is turned on. This can occur via manual switch (e.g., switch 115 in FIG. 1) or via common voice input term, as will be appreciated in light of the present disclosure. At 615, a voice command is detected, which can include one or the voice commands disclosed herein, as well as other voice commands that will be apparent to one having ordinary skill in the art and in accordance with the present disclosure. At 620, the system (e.g., controller 430) determines if the voice command is a music-dependent command. If the voice command is not a music-dependent command, then the light is controlled according to the mode that correspond to the command at 625. For example, the steady on command is not dependent of the music and thus there is no need for the music microphone to be turned on or other processing power to be wasted detecting and analyzing the music signal. If the voice command is a music-dependent command, then the music microphone is turned on at 630. Then at 635, the light is controlled according to the detected music signal, for example in accordance with the techniques disclosed in U.S. Pat. No. 10,492,277. It will be appreciated that the music-dependent commands are optional and some implementations may include a voice command microphone only, in which a voice command is used to control the light according to one of a plurality of pre-stored commands that each correspond to a different mode of operation for the light sources.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A system for lighting control, comprising:
 a first microphone for receiving one or more voice commands;
 a controller coupled to the first microphone for receiving the one or more voice commands from the first microphone;
 the controller having multiple control commands each for selecting a different light control mode of operation;
 wherein the multiple control commands have all of the following different light control modes of operation:
 i) a light show mode where the light sources are controlled in a light pattern according to the beat of a music signal;
 ii) a steady on mode where the light sources are controlled to be continuously on;
 iii) a slow pulse mode where the light sources are controlled to be pulsed;
 iv) a blinking mode where the light sources are blinking rapidly; and
 v) an off mode where the light source are turned off; and
 vi) a pulsing as a function of the music beat signal;
 wherein the light sources are comprised of separate side-by-side light strings that each support spaced apart LEDs;
 a second microphone for receiving a music signal;
 both said first microphone and said second microphone connecting directly to the controller;
 a light driver for driving the one or more light sources;
 the light driver including a power source that feeds a voltage regulator that powers the controller;

a power switch that connects the power source to the voltage regulator;

a memory connected to the controller and for storing the control commands;

a mode button connected to the controller and that allows a user to manually transition between the modes either in lieu of, or in addition to, the voice commands;

wherein the controller has multiple control commands each for selecting a different light control mode of operation, wherein at least one light control mode of operation is dependent on the music signal;

wherein each light control mode of operation is controlled by a common voice input term followed by at least one of the voice commands;

wherein the common voice input term is "Hi Beatsync"; and wherein the term "Hi Beatsync" is repeated before initiating any of the multiple control commands.

\* \* \* \* \*